US012773732B2

(12) United States Patent
Uchiyama et al.

(10) Patent No.: US 12,773,732 B2
(45) Date of Patent: Oct. 27, 2026

(54) MACHINE TOOL SYSTEM AND METHOD OF CONTROLLING MACHINE TOOL SYSTEM

(71) Applicant: STAR MICRONICS CO., LTD., Shizuoka (JP)

(72) Inventors: Takuji Uchiyama, Shizuoka (JP); Katsuhiro Shinomiya, Shizuoka (JP); Takeshi Ikegaya, Shizuoka (JP); Norio Kaku, Shizuoka (JP)

(73) Assignee: STAR MICRONICS CO., LTD., Shizuoka (JP)

( * ) Notice: Subject to any disclaimer, the term of this patent is extended or adjusted under 35 U.S.C. 154(b) by 348 days.

(21) Appl. No.: 18/489,273

(22) Filed: Oct. 18, 2023

(65) Prior Publication Data

US 2024/0131597 A1 Apr. 25, 2024
US 2024/0227026 A9 Jul. 11, 2024

(30) Foreign Application Priority Data

Oct. 24, 2022 (JP) ................................ 2022-169781

(51) Int. Cl.
*B23B 1/00* (2006.01)
*B23B 9/08* (2006.01)
(Continued)

(52) U.S. Cl.
CPC .................. *B23B 1/00* (2013.01); *B23B 9/08* (2013.01); *B23B 7/06* (2013.01); *B23B 13/021* (2013.01); *B23B 13/123* (2013.01)

(58) Field of Classification Search
CPC ........... B23B 9/08; B23B 7/06; B23B 13/126; B23B 13/021; B23B 13/02; B23B 13/123;
(Continued)

(56) References Cited

U.S. PATENT DOCUMENTS 5,946,993 A * 9/1999 Flanagan ............... B23Q 7/006 82/127
9,327,375 B2 * 5/2016 Yamane ................. B23Q 5/048
(Continued)

FOREIGN PATENT DOCUMENTS

JP 2003211302 A 7/2003
JP 2005313267 A 11/2005
(Continued)

OTHER PUBLICATIONS

Extended European search report (EESR) for its corresponding European application in 23203139.3-1205 dated Mar. 19, 2024; pp. 1-8.

(Continued)

*Primary Examiner* — Sara Addisu
(74) *Attorney, Agent, or Firm* — Muncy, Geissler, Olds & Lowe, P.C.

(57) ABSTRACT

A lathe system includes a spindle capable of gripping a bar and moving back and forth in an axial direction of the bar and a tool post to which a first tool is attached. The lathe system can manufacture a plurality of products having an identical shape from the bar by repeating a machining of the bar, a cutting off of a machined portion of the bar, and a grip change by the spindle, the grip change by the spindle comprising releasing the bar, moving back, and re-gripping the bar at a predetermined gripping position. The lathe system further includes a gripping position selecting unit capable of selecting a special gripping position at which the spindle re-grips the bar when a state of the machine tool system meets a predetermined condition, the special gripping position being different from the predetermined gripping position.

6 Claims, 13 Drawing Sheets

(51) Int. Cl.

| | |
|---|---|
| *B23B 7/06* | (2006.01) |
| *B23B 13/02* | (2006.01) |
| *B23B 13/12* | (2006.01) |

(58) Field of Classification Search
CPC ... B23B 2260/1285; B23B 13/08; B23B 1/00; G05B 19/4166; G05B 19/4065; B23Q 17/0952; B23Q 17/2233; B23Q 11/00
See application file for complete search history.

(56) References Cited

U.S. PATENT DOCUMENTS

| | | | | |
|---|---|---|---|---|
| 2002/0183888 | A1 | 12/2002 | Sasaki et al. | |
| 2021/0402483 | A1 | 12/2021 | Noguchi et al. | |
| 2023/0060229 | A1* | 3/2023 | Kamo | G05B 19/4155 |
| 2024/0123510 | A1* | 4/2024 | Uchiyama | B23B 13/021 |
| 2024/0139823 | A1* | 5/2024 | Atsuhara | B23B 13/021 |
| 2025/0178097 | A1* | 6/2025 | Suzuki | B23B 13/126 |
| 2025/0222524 | A1* | 7/2025 | Mochizuki | G05B 19/4166 |

FOREIGN PATENT DOCUMENTS

| | | | | |
|---|---|---|---|---|
| JP | 2017209776 | A | 11/2017 | |
| JP | 2022177508 | A * | 12/2022 | B23B 25/06 |
| WO | WO-2020085454 | A1 * | 4/2020 | B23P 23/04 |

OTHER PUBLICATIONS

Office Action of JP Application No. 2022-16781 and English translation, dated Jul. 7, 2026, 12 pages.

* cited by examiner

MACHINE TOOL SYSTEM AND METHOD OF CONTROLLING MACHINE TOOL SYSTEM

CROSS-REFERENCES

This application claims priority of Japanese Patent Application No. 2022-169781 filed on Oct. 24, 2022. The contents of this application are incorporated herein by reference in their entirety.

BACKGROUND OF THE INVENTION

The present invention relates to a machine tool system including a spindle capable of gripping a bar and moving back and forth in an axial direction of the bar and a tool post to which a machining tool is attached to manufacture a plurality of products having an identical shape from the bar by repeating a machining of the bar, a cutting off of a machined portion of the bar, and a grip change by the spindle, the grip change by the spindle including releasing the bar, moving back, and re-gripping the bar at a predetermined gripping position. The present invention also relates to a method of controlling the machine tool system.

Conventionally, there is a machine tool system that includes a machining apparatus having a spindle, a tool post, and a bar feeder that supplies a long bar to the machining apparatus. See Japanese Unexamined Patent Application Publication No. 2005-313267. The spindle of the machining apparatus rotates while releasably gripping the bar. The spindle is movable in the axial direction of the bar regardless of whether the spindle grips or releases the bar. A first control apparatus is built into the machining apparatus. The first control apparatus controls the operation of the spindle or the tool post to which the machining tool is attached according to a machining program (NC program) created by, for example, an operator of the machine tool system or an input operation by using the operation panel provided in the machining apparatus. The first control apparatus controls the operation of the tool post and the spindle according to the machining program, and accordingly, the front end portion of the bar is machined into a desired shape and the machined portion having been machined is cut off. In many cases, the bar is gripped by the spindle from when the machining tool starts machining until the machining tool cuts off the machined portion. The machining apparatus performs a grip change of the bar after cutting off the machined portion. In the grip change, the spindle releases gripping, moves back toward the rear end of the bar, and then re-grips the bar. A plurality of products corresponding to the number of cycles are manufactured from one bar by repeating a machining with the machining tool, a cutting off of the bar, and a grip change of the bar for a plurality of cycles.

The bar feeder is provided alongside the machining apparatus so as to be closer to the rear end of the bar than the machining apparatus is. The bar feeder includes a pusher, a pusher driving mechanism that moves the pusher in the axial direction of the bar, and a second control apparatus that controls the operation of the pusher driving mechanism. The pusher has a finger chuck at the front end thereof. The finger chuck grips the rear end portion of the bar, and accordingly, the pusher is coupled to the bar. Then, the pusher driving mechanism feeds the pusher toward the front end of the bar, and accordingly, the bar input to the bar feeder is supplied to the machining apparatus. While the machining apparatus performs machining, the pusher biases the bar from the rear end of the bar toward the front end of the bar with a predetermined load. This load is set to a relatively small load that does not cause a slip between the bar and the spindle when the spindle grips the bar.

A steadying apparatus may be attached in a position at the rear side of the spindle. The steadying apparatus has a steadying member that prevents the runout of the bar during rotation when in contact with the peripheral surface of the bar. The finger chuck of the pusher has an outer diameter greater than the bar and may have a notch. Accordingly, when the steadying member comes into contact with the finger chuck, the steadying member may be broken. Accordingly, when the pusher is located within a predetermined range, the steadying member is controlled to retreat to a retreat position that is radially away from the bar so as to prevent the steadying member from coming into contact with the finger chuck.

SUMMARY OF THE INVENTION

When the steadying member is evacuated to the retreat position or the steadying apparatus is not attached, a portion of the long bar at the rear side from the portion gripped by the spindle is cantilever-supported. The portion of the bar at the rear side of the gripped position possibly rotates with great runout depending on the length of the bar and the number of revolutions of the spindle. When the bar rotates with great runout, the spindle gripping the bar vibrates accordingly. The machining quality may degrade and the manufactured product may become defective. It is conceivable to reduce the number of revolutions of the spindle as a countermeasure, but this countermeasure may reduce the machining speed and degrade the machining quality.

The present invention addresses the problem described above with an object of providing a machine tool system and a method of controlling a machine tool system that prevent degradation in the machining quality.

According to the present invention, there is provided a machine tool system that solves the problem described above, the machine tool system including:

a spindle capable of gripping a bar and moving back and forth in an axial direction of the bar; a tool post to which a machining tool is attached, the machining tool machining a portion of the bar gripped by the spindle; the machine tool system capable of manufacturing a plurality of products having an identical shape from the bar by repeating a machining of the bar, a cutting off of a machined portion of the bar, and a grip change by the spindle, the grip change by the spindle comprising releasing the bar, moving, back, and re-gripping the bar at a predetermined gripping position, and the machine tool system further comprising a gripping position selecting unit capable of selecting a special gripping position at which the spindle re-grips the bar when a state of the machine tool system meets a predetermined condition, the special gripping position being different from the predetermined gripping position.

In the machine tool system, selection of the gripping position by the gripping position selecting unit can suppress the runout of the bar and prevent degradation in the machining quality.

Here, the gripping position selecting unit may select a position at which the bar is re-gripped during the grip change. The predetermined gripping position may be specified by the machining program or may be input from the operation panel. The special gripping position may be specified by the machining program, may be calculated based on the properties of the bar and the number of revolutions of the spindle, may be calculated according to the movable distance of the spindle in the axial direction, or may be input from the operation panel.

In the machine tool system, the special gripping position is a rearer position than the predetermined gripping position with respect to the axial direction.

This can suppress the bar W from rotating at a critical speed and prevent degradation in the machining quality.

The machine tool system may further include:

a steadying apparatus disposed in a rearer position than the spindle with respect to the axial direction, the steadying apparatus comprising a steadying member movable between a steadying position in contact with the bar and a retreat position away from the bar, wherein the state of the machine tool system meets the predetermined condition when a determination to move the steadying member to the retreat position before the grip change is made.

The special gripping position is selected when a determination to move the steadying member to the retreat position is made. When the steadying member moves away from the bar, the runout can be suppressed and degradation in the machining quality can be prevented. Here, the retreat position may be a position to which the steadying member moves away from the bar in the radial direction of the bar.

In addition, the machine tool system may further include a pusher capable of moving together with the bar, wherein the state of the machine tool system meets the predetermined condition when the pusher is located in a first range in the axial direction before the grip change.

Appropriate setting of the first range can suppress the runout of the bar and prevent degradation in the machining quality.

Here, the machine tool system may have a pusher position grasping unit that grasps the pusher position in the axial direction. In addition, the first range may be changed by the operator.

In addition, in the machine tool system, the first range may be specified by a machining program.

As a result, the operator can change the first range with a simple operation.

In addition, the machine tool system may further include a vibration detector capable of detecting vibration generated by runout of the bar, wherein the state of the machine tool system meets the predetermined condition when the vibration detected by the vibration detector exceeds a threshold.

Since the special gripping position is selected when the vibration detected by the vibration detector exceeds the threshold, the runout of the bar can be suppressed and degradation in the machining quality can be prevented.

Here, the vibration detector may be attached to the spindle. In addition, the predetermined condition may be met when the amplitude of the vibration detected by the vibration detector exceeds the threshold or to be met when the acceleration of the vibration detected by the vibration detector exceeds the threshold.

According to the present invention, there is provided a method of controlling a machine tool system that solves the problem described above.

A method of controlling a machine tool system including a spindle and a tool post to which a machining tool is attached, the machine tool system manufacturing a plurality of products having an identical shape from the bar, the method comprising:

selecting a gripping position that selects a predetermined gripping position when a state of the machine tool system does not meet a predetermined condition and that selects a special gripping position when the state of the machine tool system meets the predetermined condition, the special gripping position being different from the predetermined gripping position;

performing a grip change by the spindle that comprises releasing the bar, moving to the selected gripping position, and re-gripping the bar;

machining the re-gripped bar; and cutting off a machined portion of the bar.

In the method of controlling a machine tool system, the selection of the appropriate gripping position in the gripping position selecting step can suppress the runout of the bar and prevent degradation in the machining quality.

According to the present invention, a machine tool system and a method of controlling a machine tool system that prevent degradation in the machining quality can be provided.

DETAILED DESCRIPTION

Embodiments of the present invention will be described below with reference to the drawings. In an embodiment, the present invention will be described using an example in which the present invention is applied to a lathe system including an NC lathe and a bar feeder.

Figure 1:
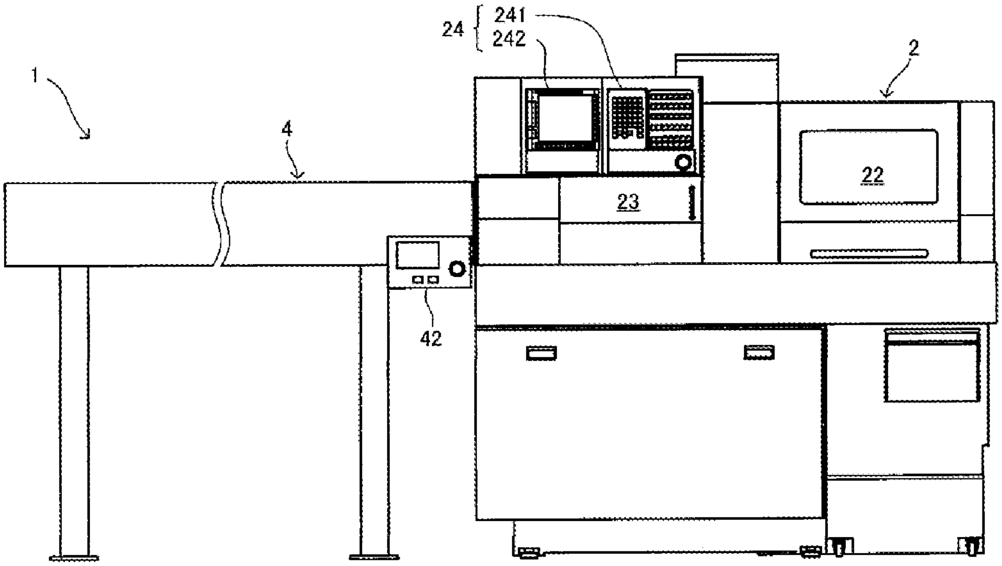
FIG. 1 is a front view of a lathe system of an embodiment.

FIG. 1 is a front view of a lathe system of an embodiment.

As illustrated in FIG. 1, a lathe system 1 of the embodiment includes an NC lathe 2, which is a machining apparatus, and a bar feeder 4, which is a material feeding device. This lathe system 1 corresponds to an example of a machine tool system. The NC lathe 2 of the embodiment is a so-called a Swiss-type lathe. The NC lathe 2 includes a machining chamber 22, a spindle chamber 23, and a lathe operation panel 24. The machining chamber 22 is a chamber having a space for machining the front end portion of a bar W (see FIG. 2) and is disposed on the right side of the NC lathe 2 as viewed from the front side. The spindle chamber 23 is a chamber in which a spindle 25 (see FIG. 2) is provided and is disposed on the left side of the NC lathe 2 as viewed from the front side.

The lathe operation panel 24 includes a lathe operation unit 241 and a lathe display screen 242. The lathe operation unit 241 includes a plurality of buttons, a plurality of keys, and the like that receive input operations by an operator of the lathe system 1. The lathe operation unit 241 may be a touch panel integrated with the lathe display screen 242. The operator of the lathe system 1 can store a machining program created by using the lathe operation unit 241 or an external computer in the storage unit 203 to be described later (see FIG. 4). In addition, the operator of the lathe system 1 can modify the machining program by using the lathe operation unit 241 and store the modified machining program in the storage unit 203. Furthermore, the operator of the lathe system 1 can operate the components of the lathe system 1 individually or in cooperation by using the lathe operation unit 241. The lathe display screen 242 is a display that indicates machining programs stored in the storage unit 203 and various types of information about the lathe system 1, such as various settings of the lathe system 1 and error details.

The bar feeder 4 supplies long bars W (see FIG. 2) to the NC lathe 2. The bar feeder 4 is provided alongside the NC lathe 2. The bar feeder 4 stores the plurality of bars W. The bar feeder 4 feeds one of the stored bars W toward the NC lathe 2. In addition, the bar feeder 4 pulls out a remaining bar, which is the bar W shortened by machining, from the NC lathe 2 and discharges the remaining bar. After discharging the remaining bar, the bar feeder 4 feeds a new one of the stored bars W toward the NC lathe 2. The bar feeder 4 has a bar feeder operation panel 42, which is an input device for operating the bar feeder 4.

Figure 2:
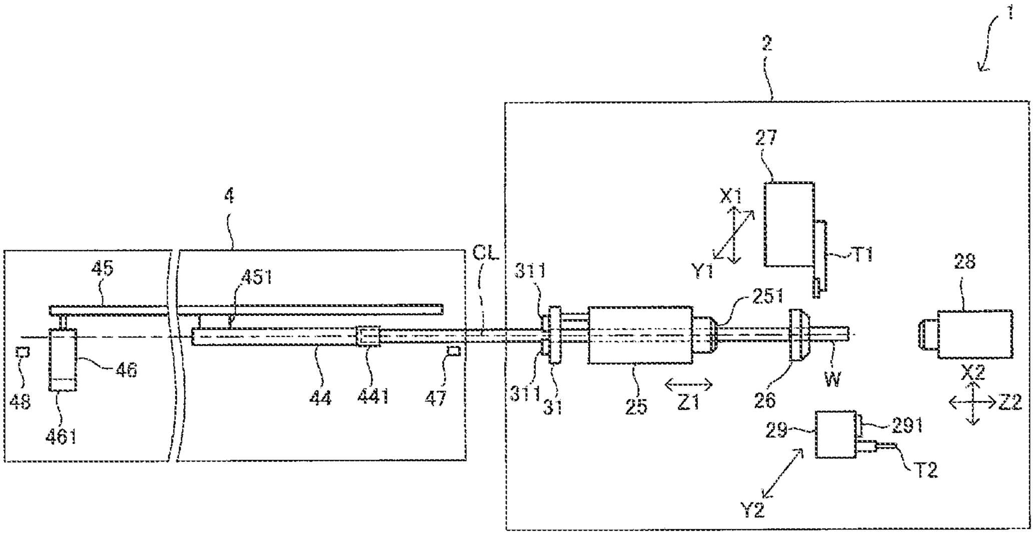
FIG. 2 is a plan view schematically illustrating the internal structure of the lathe system illustrated in FIG. 1.

FIG. 2 is a plan view schematically illustrating the internal structure of the lathe system illustrated in FIG. 1.

As illustrated in FIG. 2, the NC lathe 2 includes the spindle 25, a guide bush 26, a first tool post 27, a back spindle 28, and a second tool post 29. The spindle 25, the guide bush 26, the first tool post 27, the back spindle 28, and the second tool post 29 are disposed on a leg, which is the base. The spindle 25, the first tool post 27, the back spindle 28, and the second tool post 29 operate according to a machining program for describing a machining operation or an input operation from the lathe operation panel 24 (see FIG. 1).

The spindle 25 is movable in a Z1-axis direction. The spindle 25 is mounted on a not-shown headstock to move in the Z1-axis direction by a headstock together with the headstock. The Z1-axis direction is the horizontal direction and is the left-right direction in FIG. 2. This Z1-axis direction corresponds to an example of the axial direction of the bar W. The spindle 25 has a collet chuck 251 in the front end portion thereof for releasably gripping the bar W passing through the spindle 25. The spindle 25 is rotatable about a spindle axis CL while gripping the bar W. The direction of the spindle axis CL coincides with the Z1-axis direction. The movement of the spindle 25 toward the front end of the bar W may be referred to below as advancing, and the movement of the spindle 25 toward the rear end of the bar W may be referred to below as retracting. In FIG. 2, the right direction is the advance direction and the left direction is the retraction direction.

The guide bush 26 is fixed to the leg, which is the base. An end surface of the guide bush 26 opposite to the side on which the spindle 25 is disposed is exposed to the inside of the machining chamber 22 (see FIG. 1). The guide bush 26 supports the front end portion of the bar W having passed through the spindle 25 slidably in the Z1-axis direction. The portion of this guide bush 26 that supports the bar W is rotatable about the spindle axis CL in sync with the spindle 25. The front end portion of the bar W projecting from the guide bush 26 into the machining chamber 22 is machined by a first tool T1 attached to the first tool post 27. This first tool T1 corresponds to an example of a machining tool. Since the guide bush 26 suppresses the bending of the bar W during machining, particularly a long and narrow bar W can be machined by the NC lathe 2 with high accuracy.

The first tool post 27 is movable in an X1-axis direction that is orthogonal to the Z1-axis direction and aligned with the horizontal direction, and a Y1-axis direction that is aligned with the vertical direction. This first tool post 27 corresponds to an example of a tool post. In FIG. 2, the vertical direction is the X1-axis direction, and the direction that is orthogonal to the sheet is the Y1-axis direction. A plurality of types of first tools T1 including a cutting tool, a cut-off tool, and the like arranged in the Y1-axis direction are attached to the first tool post 27 to form a comb shape. In addition, a rotary tool, such as an end mill or a drill, can also be attached to the first tool post 27 as the first tools T1. Any of the plurality of types of first tools T1 is selected by moving the first tool post 27 in the Y1-axis direction. Then, movement of the first tool post 27 in the X1-axis direction causes the selected first tool T1 to cut into and machine the front end portion of the bar W gripped by the spindle 25 and supported by the guide bush 26 or to cut off the machined portion of the bar W. It should be noted that a tool for cutting off a machined portion is a cut-off tool.

The back spindle 28 is movable in an X2-axis direction and a Z2-axis direction. The back spindle 28 is mounted on a not-shown back headstock to move in the X2-axis direction and the Z2-axis direction together with the back headstock. The X2-axis direction is identical to the X1-axis direction described above, and the Z2-axis direction is identical to the Z1-axis direction described above. In addition, the Z2-axis direction corresponds to the axial direction of the back spindle 28. FIG. 2 illustrates the state in which the back spindle 28 is located at a position facing the spindle 25 across the guide bush 26. At this position, the back spindle axis, which is the center of rotation of the back spindle 28, is collinear with the spindle axis CL. The direction of the back spindle axis coincides with the Z2-axis direction. The machined portion of the bar W having been machined by using the spindle 25 is cut off by the cut-off tool and passed to the back spindle 28. The machined portion having been cut off is referred to below as the cut-off portion. The back spindle 28 releasably grips the cut-off portion passed from the spindle 25. In addition, the back spindle 28 transports the cut-off portion while gripping the cut-off portion by moving in the X2-axis direction and the Z2-axis direction.

The second tool post 29 is movable in a Y2-axis direction. The second tool post 29 may be movable in the X2-axis direction. The Y2-axis direction is identical to the Y1-axis direction described above. Second tools T2, such as a drill and an end mill for machining a cut-off portion, are attached to the second tool post 29. The plurality of second tools T2 may be attached to the second tool post 29 while being arranged alongside in the Y2-axis direction. Any of the plurality of types of second tools T2 is selected by moving the second tool post 29 in the Y2-axis direction. Then, a part of the cut-off portion closer to the cut-off end gripped by the back spindle 28 is machined by moving the back spindle 28 in the X2-axis direction and the Z2-axis direction. The part of the cut-off portion closer to the cut-off end that has been machined becomes a product manufactured by the lathe system 1. Using the back spindle 28 may be optional. When the back spindle 28 is not used, the cut-off portion may become a product without being machined. The second tool post 29 has a product receiving port 291 for receiving products and a shooter (not illustrated). The shooter is provided in the second tool post 29. After inserting the product into the product receiving port 291, the back spindle 28 drops the product into the shooter by releasing gripping and pushing the product by using a cylinder provided in the back spindle 28. The dropped product is conveyed to a predetermined position by a conveying member (not illustrated) and discharged to a product storage portion provided outside the lathe system 1.

The bar feeder 4 includes a pusher 44, a pusher driving mechanism 45, a pusher motor 46, a front end sensor 47, a home position sensor 48, and a steadying apparatus 31 in addition to the bar feeder operation panel 42 (see FIG. 1) described above. The pusher 44 is guided movably in the Z1-axis direction by a guide (not illustrated). A finger chuck 441 for gripping the rear end of the bar W is provided at the front end of the pusher 44. The finger chuck 441 is rotatable about the spindle axis CL, which is a rotational axis, by being rotatably attached to another portion of the pusher 44. The finger chuck 441 grips the rear end of the bar W, and accordingly, the pusher 44 is coupled to the bar W. That is, while the finger chuck 441 grips the bar W, the pusher 44 moves in the Z1-axis direction together with the bar.

The pusher driving mechanism 45 includes pulleys (not illustrated) provided on the front end side and the rear end side of the bar feeder 4 and a drive belt stretched over the pulleys. A coupling portion 451 is fixed to the drive belt. The coupling portion 451 couples the drive belt and the rear end portion of the pusher 44 to each other. The pulley provided on the rear end side of the bar feeder 4 is fixed to the output shaft of the pusher motor 46.

When the output shaft of the pusher motor 46 rotates in one direction, the pusher driving mechanism 45 and the coupling portion 451 move the pusher 44 toward the NC lathe 2 in the Z1-axis. Conversely, when the output shaft of the pusher motor 46 rotates in the other direction, the pusher driving mechanism 45 and the coupling portion 451 move the pusher 44 away from the NC lathe 2 in the Z1-axis. The bar W with the axis aligned with the spindle axis CL among the plurality of bars W stored in the bar feeder 4 is gripped by the finger chuck 441. Then, when the pusher 44 moves, the bar W gripped by the finger chuck 441 moves in the axial direction of the bar W. That is, the bar W moves toward the front end thereof when the output shaft of the pusher motor 46 rotates in one direction, and the bar W moves toward the rear end thereof when the output shaft of the pusher motor 46 rotates in the other direction. The pusher motor 46 has a pusher encoder 461. The pusher encoder 461 may be provided separately from the pusher motor 46. The pusher encoder 461 detects the number of revolutions and the amount of rotation of the pusher motor 46. The detection results of the pusher encoder 461 are sent to a second control apparatus 40 (see FIG. 4).

The front end sensor 47 detects the front end of the bar W. In addition, the home position sensor 48 detects whether the pusher 44 is located at the home position. The home position of the pusher 44 is located on the rearmost side in the movement range of the pusher 44. The home position sensor 48 detects the rear end of the pusher 44. The detection results of the front end sensor 47 and the home position sensor 48 are sent to the second control apparatus 40 (see FIG. 4). The second control apparatus 40 grasps the front end position of the bar W when the bar W is first supplied to the NC lathe 2 after power-on or when a new bar W is supplied to the NC lathe 2 based on the detection result of the front end sensor 47 and the detection result of the pusher encoder 461. In addition, the second control apparatus 40 grasps the position of the pusher 44 based on the detection result of the home position sensor 48 and the detection result of the pusher encoder 461.

The steadying apparatus 31 is attached to the headstock (not illustrated). It should be noted that the steadying apparatus 31 is disposed in the NC lathe 2, but the steadying apparatus 31 is a component of the bar feeder 4. The steadying apparatus 31 illustrated in FIG. 2 moves in the Z1-axis direction together with the spindle 25. The steadying apparatus 31 has steadying members 311 that make contact with the peripheral surface of the bar W and steady the runout of the bar W. The structure of the steadying apparatus 31 will be described in detail below.

Figure 3A:
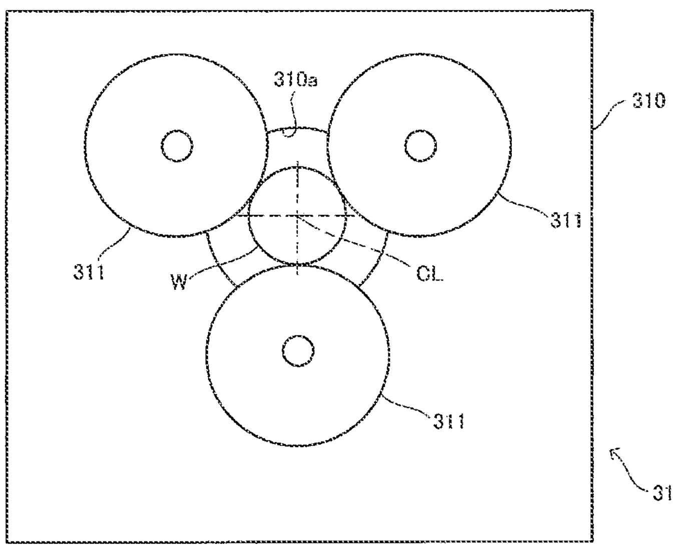
FIG. 3A is a left side view of a steadying apparatus having steadying members disposed at steadying positions.
Figure 3B:
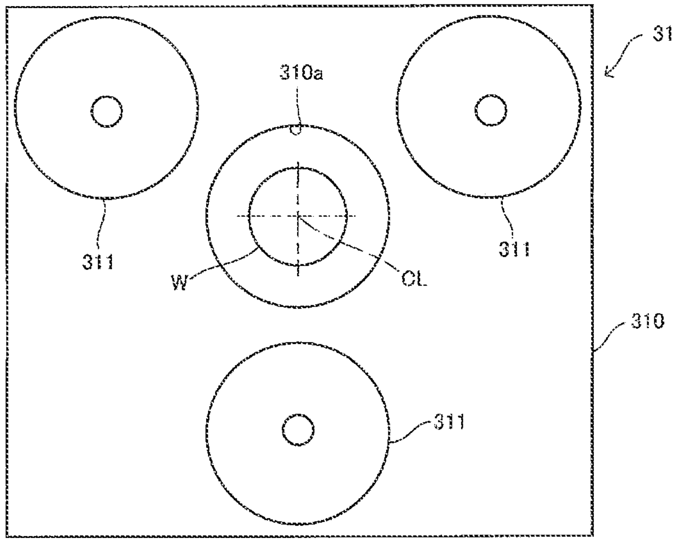
FIG. 3B is a left side view of the steadying apparatus having the steadying members disposed at retreat positions.

FIG. 3A is a left side view of a steadying apparatus having steadying members disposed at steadying positions, and FIG. 3B is a left side view of the steadying apparatus having the steadying members disposed at retracted positions. The bar W is also illustrated in FIGS. 3A and 3B.

As illustrated in FIGS. 3A and 3B, the steadying apparatus 31 includes a steadying housing 310 having a steadying through-hole 310*a* through which the bar W passes near the center, and the three steadying members 311. The number of the steadying members 311 may be two or four or more. The steadying members 311 are disposed at positions apart from each other by 120 degrees about the spindle axis CL. Each of the steadying members 311 are movable between the steadying positions in FIG. 3A and the retracted positions in FIG. 3B. Switching between the steadying positions and the retreat positions is performed by a steadying actuator 313 (see FIG. 4). The steadying actuator 313 is controlled by the first control apparatus 20 (see FIG. 4). In the steadying position, basically, the three steadying members 311 are in contact with the peripheral surface of the bar W as illustrated in FIG. 3A, but only one or two of the three steadying members 311 may be in contact with the bar W depending on the runout situation of the bar W. At the retreat positions, the three steadying members 311 are away from the bar W by retracting in the radial direction of the bar W.

Figure 4:
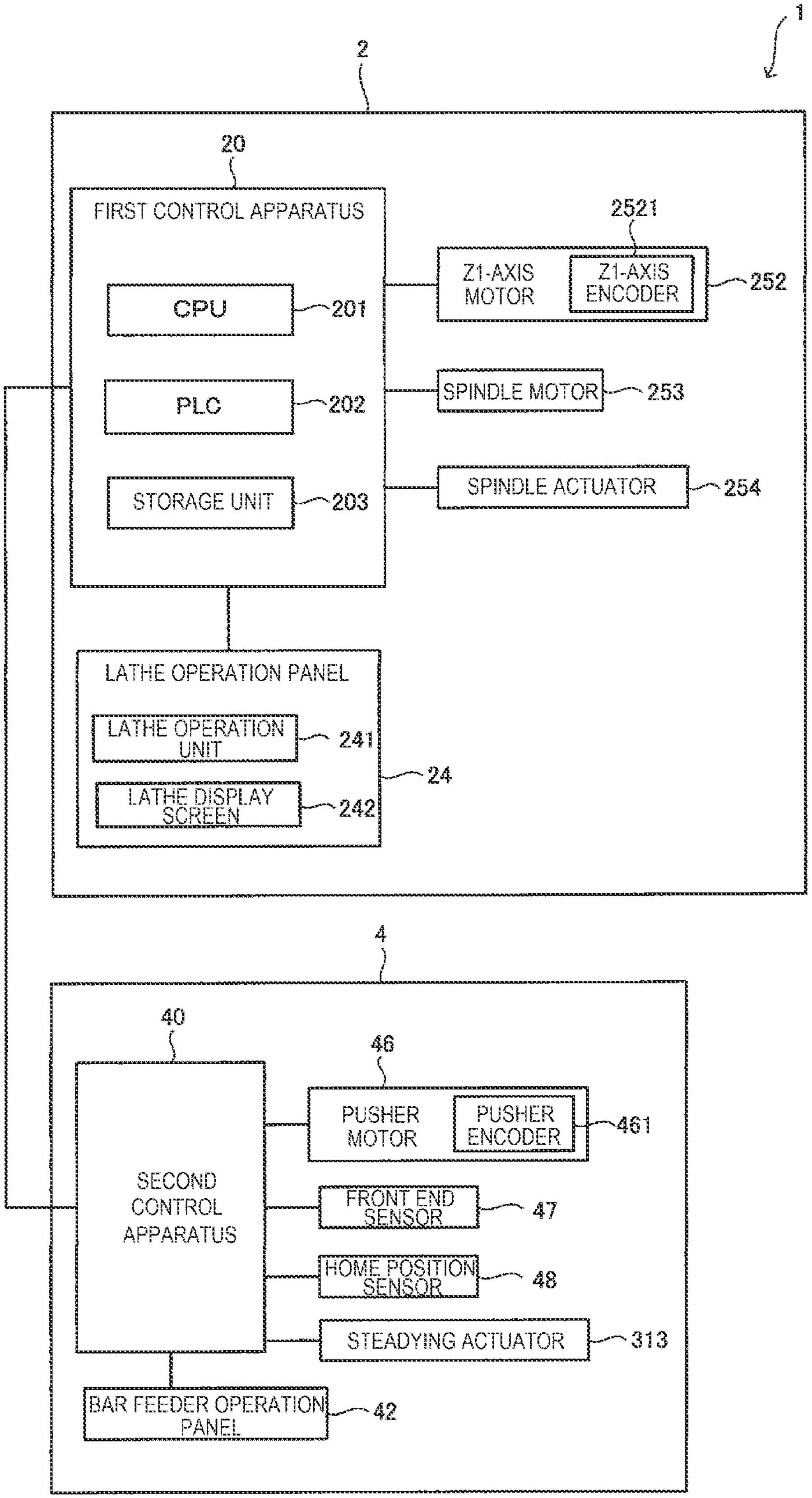
FIG. 4 is a block diagram illustrating the hardware structure of the lathe system illustrated in FIG. 1.

FIG. 4 is a block diagram illustrating the hardware structure of the lathe system illustrated in FIG. 1. It should be noted that FIG. 4 does not illustrate the hardware structure less relevant to the present invention among the hardware structure of the lathe system 1 even if the hardware structure operates the components described above.

As illustrated in FIG. 4, the NC lathe 2 includes a first control apparatus 20, the lathe operation panel 24 described above, a Z1-axis motor 252, a spindle motor 253, and a spindle actuator 254. The first control apparatus 20 is a so-called numerical control (NC) apparatus and includes a CPU 201, a programmable logic controller (PLC) 202, and the storage unit 203. The first control apparatus 20 is a computer having a computing function of the CPU 201. The first control apparatus 20 controls the operations of individual components, such as the spindle 25, the first tool post 27, the back spindle 28, and the second tool post 29 illustrated in FIG. 2, according to the machining program stored in the storage unit 203 and input operations from the lathe operation panel 24. FIG. 4 illustrates some of the motors and actuators that drive the individual components. The first control apparatus 20 performs numerical control mainly for the servo motor provided in the NC lathe 2. In addition, the PLC 202 of the first control apparatus 20 performs sequence control mainly for the operations of devices other than the servo motors for the cylinder, the valve, and the like provided in the NC lathe 2.

The storage unit 203 stores various programs, such as a ladder program and a macro program, in advance. Furthermore, the operator stores various types of information, such as data about tools, data about the diameter of the bar W, and data about the length of a product, in the storage unit 203 in addition to the machining program. The storage unit 203 includes non-volatile memories, such as a ROM, an HDD, and an SSD, and volatile memories, such as a RAM.

The Z1-axis motor 252 is a servo motor that rotates by receiving an instruction from the first control apparatus 20. Rotation of the Z1-axis motor 252 moves the spindle 25 (see FIG. 2) in the Z1-axis direction. An amplifier (not illustrated) may be provided between the first control apparatus 20 and the Z1-axis motor 252, and the first control apparatus 20 controls the Z1-axis motor 252 by sending a command to the amplifier. The amplifier will not be described below. The Z1-axis motor 252 has a Z1-axis encoder 2521. Since the output of the Z1-axis encoder 2521 is fed back to the first control apparatus 20, the first control apparatus 20 always grasps the position of the spindle 25 (see FIG. 2) in the Z1-axis direction.

The spindle 25 (see FIG. 2) has the spindle motor 253, such as a built-in motor. The spindle motor 253 rotates by receiving an instruction from the first control apparatus 20. As the spindle motor 253 rotates, the spindle 25 and the bar W (see FIG. 2) gripped by the spindle 25 rotate about the spindle axis CL (see FIG. 2). The back spindle 28 also has a back spindle motor, but a description thereof will be omitted. The spindle actuator 254 is an actuator, such as a hydraulic cylinder, for operating the collet chuck 251 (see FIG. 2). The spindle actuator 254 moves the chuck sleeve (not illustrated) in the advance direction, and accordingly, the collet chuck 251 closes and the bar W is gripped by the spindle 25. In addition, the movement of the chuck sleeve in the retraction direction opens the collet chuck 251 and causes the spindle 25 to release the bar W.

The bar feeder 4 includes the second control apparatus 40 and the steadying actuator 313 in addition to the bar feeder operation panel 42, the pusher motor 46, the front end sensor 47, and the home position sensor 48 described above. The second control apparatus 40 performs sequence control of the individual components of the bar feeder 4. The steadying actuator 313 may be a hydraulic cylinder for moving the steadying members 311 to the steadying positions illustrated in FIG. 3A and the retreat positions illustrated in FIG. 3B. The second control apparatus 40 controls the operations of actuators (not illustrated) provided in the bar feeder 4 and the pusher motor 46 according to the information received from the sensors, the pusher encoder 461, and the like. In addition, the second control apparatus 40 controls the operation of the bar feeder 4 according to an operation request from the first control apparatus 20. In addition, the second control apparatus 40 also controls the operation of the steadying apparatus 31 disposed in the NC lathe 2 by controlling the steadying actuator 313. Then, when having moved the steadying members 311 to the steadying positions or the retreat positions, the second control apparatus 40 notifies the first control apparatus 20 of the fact.

The pusher motor 46 is a servo motor that rotates by receiving an instruction from the second control apparatus 40. Rotation of the pusher motor 46 moves the pusher 44 (see FIG. 2) in the Z1-axis direction. As described above, the second control apparatus 40 always grasps the Z1-axis direction position of the pusher 44 by grasping the moving distance from the home position of the pusher 44 according to the detection result of the home position sensor 48 and the detection result of the pusher encoder 461, and sends the position to the first control apparatus 20 as information about the bar feeder 4. In addition, the second control apparatus 40 sends, to the first control apparatus 20, the Z1-axis direction position of the front end of the bar W to be newly supplied or the front end of the bar W first fed to the NC lathe 2 after power-on. After the NC lathe 2 starts machining, the pusher motor 46 is controlled by the second control apparatus 40 to rotate in one direction basically at a constant torque until the remaining bar is pulled out. This causes the pusher 44 to bias the bar W toward the front end of the bar W with a set load. This load is set to a relatively small load that does not cause a slip between the bar W and the spindle 25 when the spindle 25 grips the bar W.

The bar feeder operation panel 42 is a touch panel in which an operation unit is integrated with the display screen. The bar feeder 4 may be provided with an emergency stop button, a torque setting switch for the pusher motor 46, and the like in addition to the bar feeder operation panel 42. The operator of the lathe system 1 can manually move the pusher 44 (see FIG. 2) in the Z1-axis direction or input various setting values of the bar feeder 4 by using the bar feeder operation panel 42. In addition, the bar feeder operation panel 42 indicates various types of information about the bar feeder 4, such as various setting values and error details of the bar feeder 4, and operation buttons for the bar feeder 4.

The first control apparatus 20 and the second control apparatus 40 are connected to each other by a signal cable. The first control apparatus 20 sends an operation request or the like to the second control apparatus 40 via the signal cable. In addition, the second control apparatus 40 sends, to the first control apparatus 20, various types of information about the bar feeder 4 including the position information of the pusher 44 at any time via the signal cable.

Figure 5:
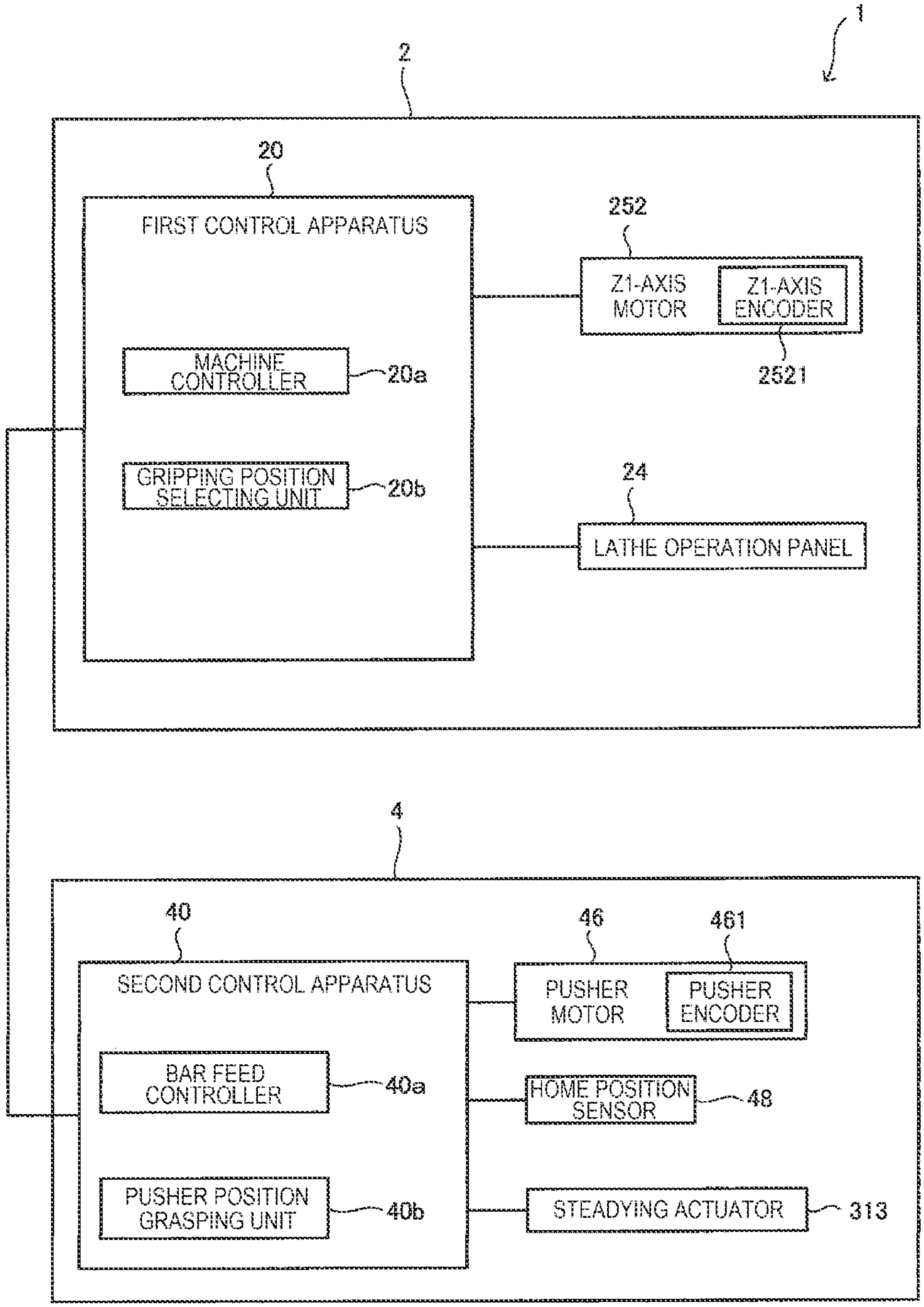
FIG. 5 is a functional block diagram illustrating a functional structure of the lathe system illustrated in FIG. 1.

FIG. 5 is a functional block diagram illustrating a functional structure of the lathe system illustrated in FIG. 1. FIG. 5 also illustrates only the functional structure that is relevant particularly to the present invention, and the other functional structure of the lathe system 1 is not illustrated or described.

As illustrated in FIG. 5, a machine controller 20*a* and a gripping position selecting unit 20*b* are implemented by the first control apparatus 20. The machine controller 20*a* has a functional structure mainly achieved by the CPU 201, the PLC 202, and the storage unit 203 illustrated in FIG. 3. In addition, the gripping position selecting unit 20*b* has a functional structure mainly achieved by the CPU 201 and the storage unit 203. In addition, a bar feed controller 40*a* and a pusher position grasping unit 40*b* are implemented by the second control apparatus 40.

The machine controller 20*a* controls the operations of the individual components of the NC lathe 2. In addition, the machine controller 20*a* may send an operation request or an information sending request to the second control apparatus 40. The gripping position selecting unit 20*b* selects the position at which the spindle 25 re-grips the bar W during the grip change. Specifically, the gripping position selecting unit 20*b* selects a predetermined gripping position, which is a normal gripping position, when the state of the lathe system 1 does not meet the predetermined condition or selects a special gripping position when the state meets the predetermined condition.

The bar feed controller 40*a* has a functional structure that controls the operations of the pusher motor 46 and the like according to outputs from various sensors provided in the bar feeder 4, an input operation from the bar feeder operation panel 42, and an operation request from the first control apparatus 20. The pusher position grasping unit 40*b* grasps the rear end position of the pusher 44 (see FIG. 2) by calculating the Z1-axis direction position of the pusher 44 from the home position sensor 48 according to the detection result of the home position sensor 48 and the detection result of the pusher encoder 461. The memory (not illustrated) of the second control apparatus 40 stores the length information of the pusher 44. The pusher position grasping unit 40*b* also grasps the front end position by adding the length of the pusher 44 to the rear end position of the pusher 44.

Figure 6:
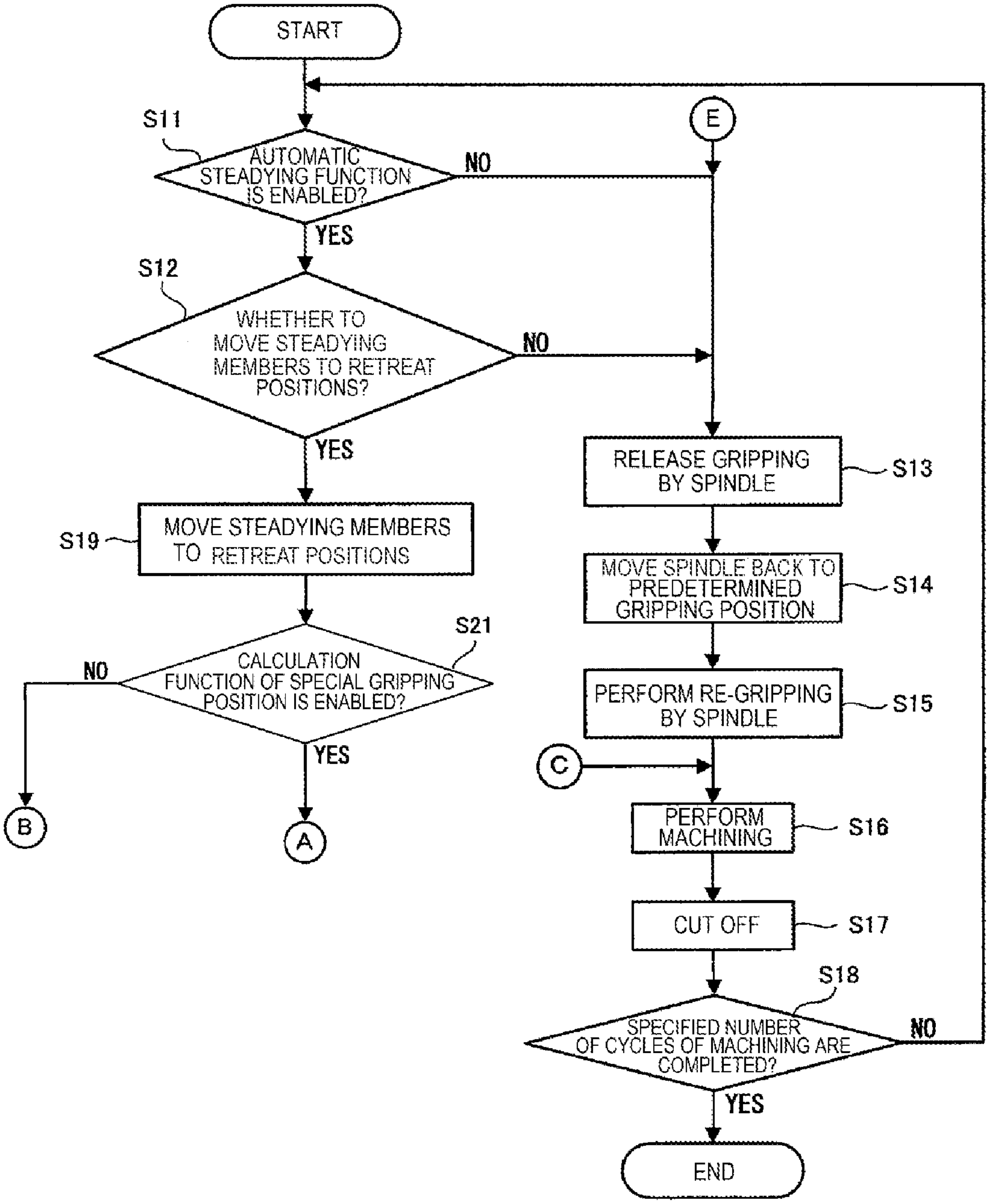
FIG. 6 is a flowchart illustrating the operation of the lathe system illustrated in FIG. 1.
Figure 7:
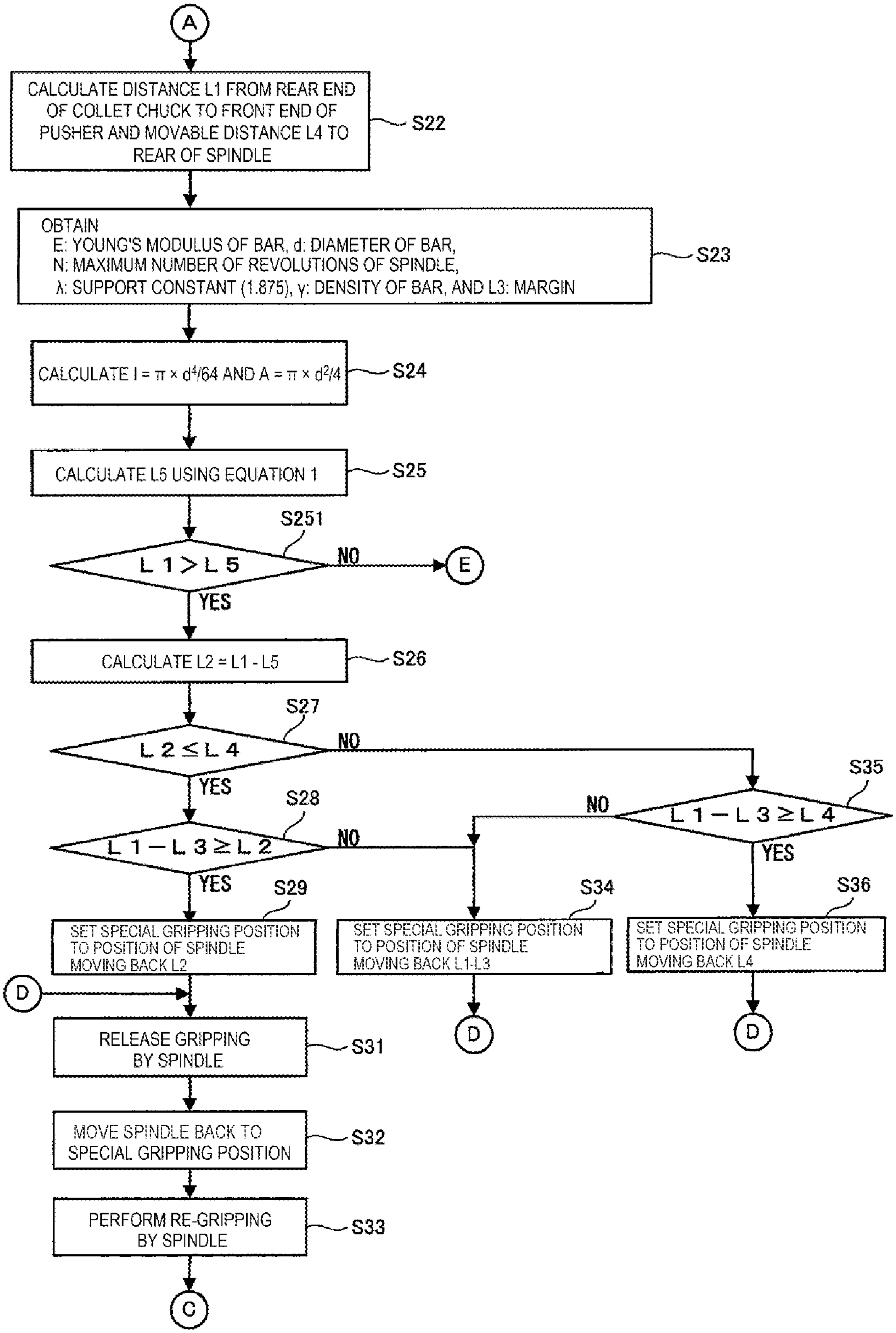
FIG. 7 is a flowchart illustrating the operation of the lathe system illustrated in FIG. 1.
Figure 8:
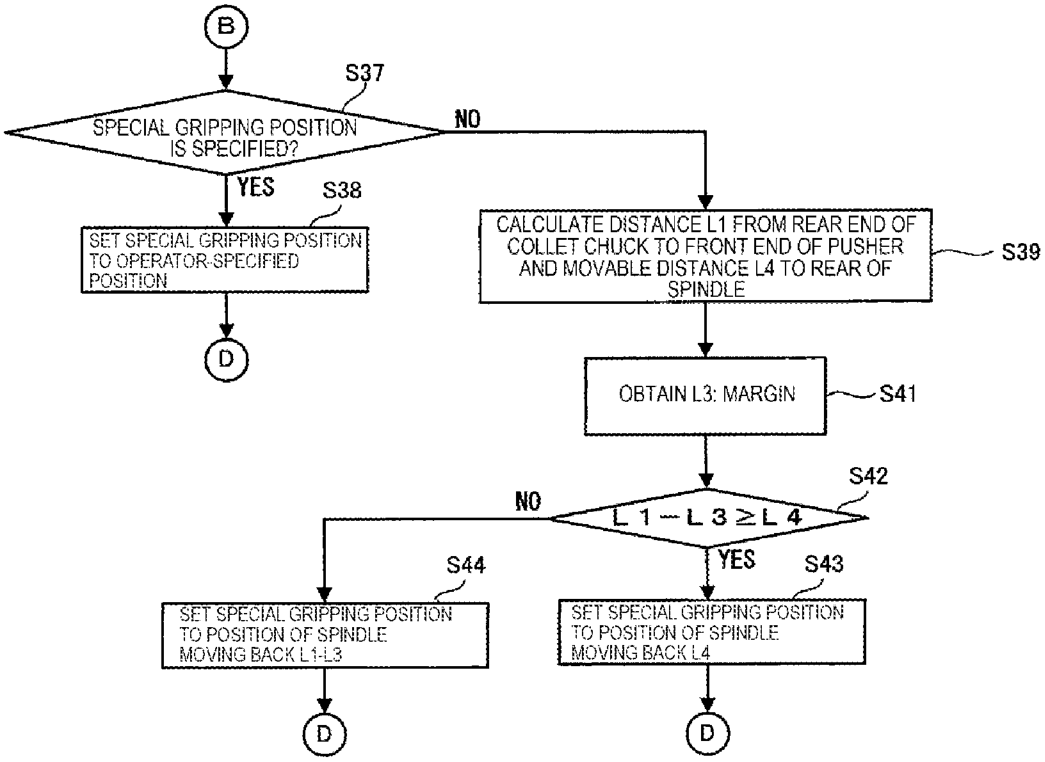
FIG. 8 is a flowchart illustrating the operation of the lathe system illustrated in FIG. 1.

FIGS. 6, 7, and 8 are a flowchart illustrating the operation of the lathe system illustrated in FIG. 1.

The flowchart in FIGS. 6, 7, and 8 illustrates the cycle operation of the lathe system 1 to be performed according to the machining program upon completion of an initial operation after power-on or upon completion of setup work for machining a new product. One product is manufactured by performing one cycle operation, and a plurality of products with the same shape are manufactured by performing a plurality of cycle operations. In the initial operation or the setup operation, the front end of the bar W is cut off by a cut-off tool. In the state in which the initial operation or the setup operation is completed, the cut-off tool functions as a stopper and the front end of the bar W is in contact with the cut-off tool. In this state, the bar W is pushed against the cut-off tool by being biased toward the front end by the pusher 44.

As illustrated in FIG. 6, the gripping position selecting unit 20*b* first determines whether an automatic steadying function is enabled (step S11). The enabling or disabling of the automatic steadying function is specified by the machining program and the specified value is stored in the storage unit 203. However, the enabling or disabling of the automatic steadying function may also be stored in the storage unit 203 via an input operation from the lathe operation panel 24. When the automatic steadying function is enabled (YES in step S11), the gripping position selecting unit 20*b* selects one of the predetermined gripping position and the special gripping position according to a determination whether or not to move the steadying members 311 from the steadying positions to the retreat positions before a grip change (step S12). Step S12 corresponds to an example of a gripping position selecting step. Moving the steadying members 311 to the retreat positions before a grip change corresponds to an example of the case in which the predetermined condition is met. The gripping position selecting unit 20*b* normally selects the predetermined gripping position. When the predetermined condition is met, the gripping position selecting unit 20*b* selects the special gripping position instead of the predetermined gripping position. The predetermined gripping position is a normal gripping position specified by the machining program or an input operation from the lathe operation panel 24. The special gripping position is a position suppressing runout of the bar. The special gripping position is specified separately from the predetermined gripping position or calculated as described below. The special gripping position is a different position from the predetermined gripping position. The special gripping position is normally set to a rearer position than the predetermined gripping position with respect to the axial direction of the bar or the Z1-axis direction.

Figure 9A:
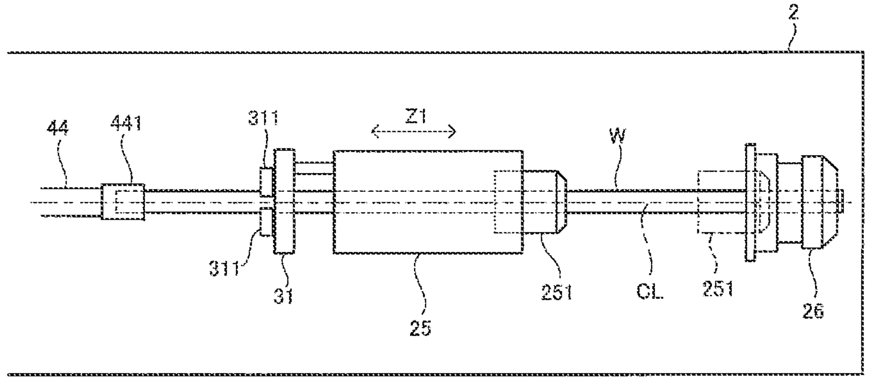
FIG. 9A is a plan view schematically illustrating the position of a pusher when the steadying members are not moved to the retreat positions.
Figure 9B:
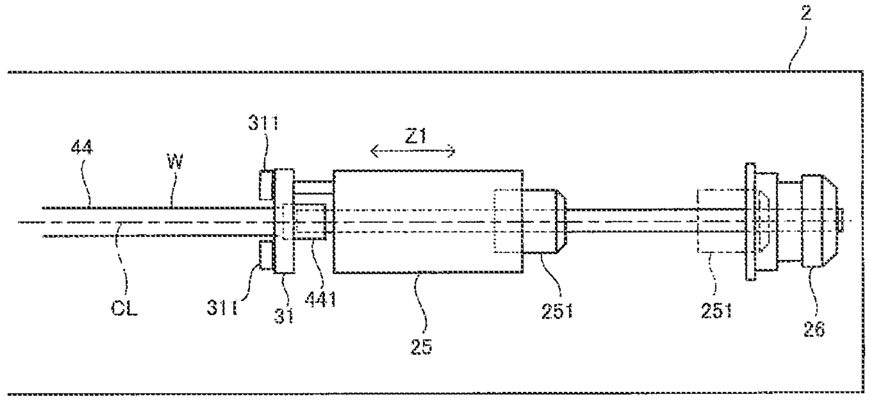
FIG. 9B is a plan view of the pusher when the steadying members are moved to the retreat positions.

FIG. 9A is a plan view schematically illustrating the position of the pusher when the steadying members are kept in the steadying positions, and FIG. 9B is a plan view schematically illustrating the position of the pusher when the steadying members are evacuated to the retreat positions.

The bar feed controller 40*a* performs control to evacuate the steadying members 311 from the steadying positions to the retreat positions when the pusher 44 has moved forward beyond a predetermined position before a grip change. The predetermined position is also referred to as a bar length shortage position. FIG. 9A illustrates the case in which the pusher 44 has not moved forward beyond the predetermined position, and FIG. 9B illustrates the case in which the pusher 44 has moved forward beyond the predetermined position. In FIGS. 9A and 9B, the collet chuck 251 before the grip change is indicated by a dot-dot-dash line, and the spindle 25 and the collet chuck 251 in a rearer position for the grip change are indicated by solid lines. The pusher position grasping unit 40*b* determines whether the pusher 44 has moved forward beyond the predetermined position. Then, when the pusher position grasping unit 40*b* determines that the pusher 44 has moved forward beyond the predetermined position, the bar feed controller 40*a* evacuates the steadying members 311 from the steadying positions to the retreat positions and notifies the machine controller 20*a* of the fact. The machine controller 20*a* may determine whether the pusher 44 has moved forward beyond the predetermined position, and the machine controller 20*a* may control the steadying apparatus 31 to evacuate the steadying members 311 from the steadying positions. Since the steadying apparatus 31 moves back together with the spindle 25, when the front end of the pusher 44 reaches the steadying members 311 located at the steadying positions, the steadying apparatus 31, the pusher 44, or the pusher driving mechanism 45 may be broken. Accordingly, the predetermined position is initially set to a position slightly behind the position that the front end of the pusher 44 reaches the steadying members 311 when the spindle 25 stays at the rearmost end in the movable range. The initial predetermined position is stored in a memory (not illustrated) of the second control apparatus 40. However, the predetermined position can be changed by an input operation from the bar feeder operation panel 42. As illustrated in FIG. 9B, the steadying members 311 evacuated to the retreat positions remain in the retreat positions until the remaining bar is pulled out from the NC lathe 2.

When the automatic steadying function is disabled (NO in step S11) and a determination not to move the steadying members 311 to the retreat positions before a grip change is made (NO in step S12), the machine controller 20*a* instructs the spindle 25 to release the bar W (step S13). When the steadying members 311 are already in the retreat positions and remain in the retreat positions, a determination not to move the steadying members 311 may be made. After that, the machine controller 20*a* moves the spindle 25 back to the predetermined gripping position (step S14) to re-grip the bar W (step S15). Steps S13 to S15 correspond to an example of a grip change step.

Next, the machine controller 20*a* machines the front end portion of the bar W re-gripped by the spindle 25 by operating the spindle 25 and the first tool post 27 according to the machining program (step S16). Step S16 corresponds to an example of a machining step. When the machining using the spindle 25 is completed, the machine controller 20*a* operates the first tool post 27 to cut off the machined portion using the cut-off tool (step S17). Step S17 corresponds to an example of a cut-off step. When the cut-off operation is completed, the machine controller 20*a* determines whether a number of cycles of machining specified by the machining program are completed after a cycle operation starts (step S18). When the specified number of cycles of machining are completed (YES in step S18), the machine controller 20*a* ends the machining operation. When the specified number of cycles of machining are not completed (NO in step S18), the processing returns to step S11.

When a determination to move the steadying members 311 to the retreat positions before a grip change is made (YES in step S12), the bar feed controller 40*a* performs control to evacuate the steadying members 311 to the retreat positions (step S19). Then, the machine controller 20*a* determines whether the calculation function of the special gripping position is enabled (step S21). The enabling or disabling of the calculation function of the special gripping position is specified by the machining program and the specified value is stored in the storage unit 203. However, the enabling or disabling of the calculation function of the special gripping position may be stored in the storage unit 203 by an input operation from the lathe operation panel 24. When the calculation function of the special gripping position is enabled (YES in step S21) or the special gripping position is not specified in step S37, which will be described later (NO in step S37), the machine controller 20*a* performs the calculation of the special gripping position.

Figure 9C:
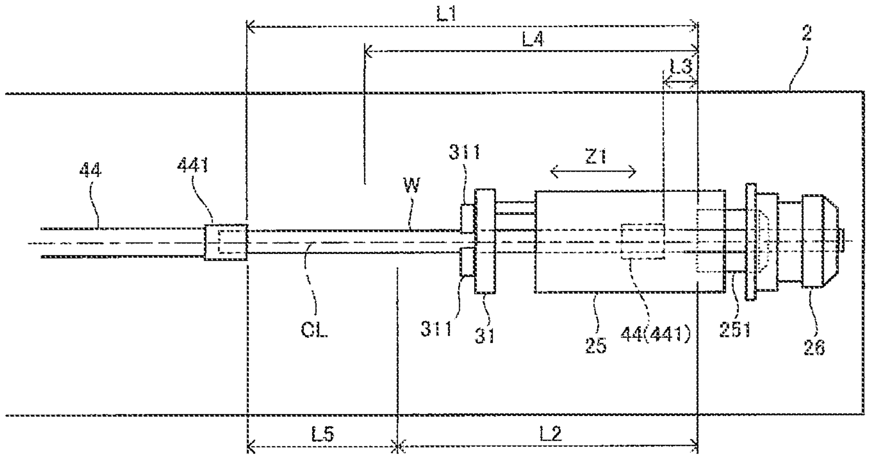
FIG. 9C is a plan view for describing distances used for the determining operation of a special gripping position.

FIG. 9C is a plan view for describing distances used for the calculation of the special gripping position in steps S22 to S29, steps S34 to S36, and steps S39 to S44.

A first distance L1 is the distance from the rear end of the collet chuck 251 to the front end of the pusher 44 before the grip change. A second distance L2 is the calculated distance that the spindle 25 moves back for the grip change. A third distance L3 is a margin for preventing collision between the collet chuck 251 and the pusher 44. This third distance L3 is stored in the storage unit 203 and can be changed by the machining program or an input operation from the lathe operation panel 24. A fourth distance L4 is the movable distance of the spindle 25 from the position of the spindle 25 before the grip change to the rearmost end in the movable range of the spindle 25. A fifth distance L5 is the distance from the rear end of the collet chuck 251 to the front end of the pusher 44 when the collet chuck 251 grips the bar W at a position at which the resonance of the bar W can be prevented.

When the calculation function of the special gripping position is enabled in step S21 in FIG. 6 (YES in step S21), the machine controller 20*a* calculates the first distance L1 and the fourth distance L4 (step S22). These distances are calculated according to the acquired position information of the spindle 25, the acquired movable range information of the spindle 25, and the position information of the pusher 44 sent from the pusher position grasping unit 40*b* at any time.

Next, the machine controller 20*a* obtains Young's modulus E ($N/mm^2$) of the bar W stored, the diameter d (mm) of the bar W, the maximum number of revolutions N (rpm) of the spindle 25 during machining, the support constant $\lambda=1.875$, the density $\gamma$ ($kg/mm^3$) of the bar W, and the third distance L3 (mm) from the storage unit 203 (step S23). The information described above may be specified in the machining program stored in the storage unit 203 or specified via an input operation from the lathe operation panel 24. Then, the machine controller 20*a* obtains the second moment of area I ($mm^4$) of the bar W by calculating $\lambda \times d^4/64$, and obtains a cross-sectional area A ($mm^2$) of the bar W by calculating $\pi \times d^2/4$ (step S24).

Then, the machine controller 20*a* calculates a distance L50 by using equation 1 described below and calculates the fifth distance L5 by using equation 2 that multiplies the distance L50 by an arbitrary safety factor S (step S25). When the length of the beam of the cantilever structure is smaller than the distance L50, no resonance occurs. That is, when the distance from the rear end of the collet chuck 251 that grips the bar W to the front end of the pusher 44 is smaller than the distance L50, the bar W is prevented from rotating at a critical speed with great runout. Conversely, when the distance from the rear end of the collet chuck 251 to the front end of the pusher 44 is greater than the distance L50 and the steadying apparatus 31 does not suppress the runout, the bar W may rotate with great runout. The calculation of the distance L50 may be omitted.

$$L50 = \sqrt{\frac{60 \times \lambda^2 \times \sqrt{\frac{E \times I \times 10^3}{\gamma \times A}}}{2 \times \pi \times N}} \quad (1)$$

$$L5 = \sqrt{\frac{60 \times \lambda^2 \sqrt{\frac{E \times I \times 10^3}{\gamma \times A}}}{2 \times \pi \times N}} \times S \quad (2)$$

The following describes an example of calculation by equation 2 when a bar made of carbon steel S50C with a diameter d of 10 mm is used as the bar W. The second moment of area I of the bar W calculated in step S24 is 490.874 $mm^4$, and the cross-sectional area A of the bar W is 78.540 $mm^2$. Young's modulus E of the bar W is $2.058 \times 10^5$ $N/mm^2$, the density $\gamma$ of the bar W is $7.874 \times 10^{-6}$ $kg/mm^3$, the maximum number of revolutions N of the spindle 25 is 6000 rpm, and a safety factor S of 0.4 is used. The support constant $\lambda$ is 1.875 as described above. The fifth distance L5 calculated in this example is 169 mm.

After that, the machine controller 20*a* compares the first distance L1 with the calculated fifth distance L5 (step S251). When the first distance L1 is equal to or smaller than the fifth distance L5 (NO in step S251), the processing proceeds to step S13, and the machine controller 20*a* moves the spindle 25 back to the predetermined gripping position for a grip change. Since the first distance L1 is short when the first distance L1 is equal to or smaller than the fifth distance L5, runout of the bar W is less likely to occur even if the spindle 25 re-grips the bar W at the predetermined gripping position.

When the first distance L1 exceeds the fifth distance L5 (YES in step S251), the machine controller 20*a* obtains the second distance L2 by subtracting the fifth distance L5 from the first distance L1 (step S26). After that, the second distance L2 is compared with the fourth distance L4, which is the distance to the rearmost end in the movable range of the spindle 25 (step S27). Step S27 determines whether the calculated second distance L2 is within the movable range of the spindle 25. When the second distance L2 is equal to or smaller than the fourth distance L4 (YES in step S27), since the second distance L2 is within the movable range, the second distance L2 is compared with the distance obtained by subtracting the third distance L3, which is a margin, from the first distance L1, which is the distance from the rear end of the collet chuck 251 to the front end of the pusher 44 (step S28). Step S28 determines whether the collet chuck 251 of the spindle 25 does not interfere with the pusher 44 even when the spindle 25 moves the calculated second distance L2. When the second distance L2 is equal to or smaller than the distance obtained by subtracting the third distance L3 from the first distance L1 (YES in step S28), the machine controller 20*a* sets the special gripping position to the position of the spindle 25 moving back the second distance L2 (step S29). The collet chuck 251 of the spindle 25 does not interfere with the pusher 44 even if the spindle 25 moves the second distance L2.

After setting the special gripping position, the machine controller 20*a* instructs the spindle 25 to release the bar W (step S31). After that, the machine controller 20*a* moves the spindle 25 back to the special gripping position (step S32) to re-grip the bar W (step S33). Steps S31 to S33 correspond to an example of a grip change step. Upon completion of re-gripping, the processing proceeds to step S16 and starts machining.

When the second distance L2 is greater than the fourth distance L4 in step S27 (NO in step S27), the fourth distance L4 is compared with the distance obtained by subtracting the third distance L3, which is a margin, from the first distance L1, which is the distance from the rear end of the collet chuck 251 to the front end of the pusher 44 (step S35). Step S35 determines whether the collet chuck 251 of the spindle 25 does not interfere with the pusher 44 even when the spindle 25 moves the fourth distance L4. When the fourth distance L4 is equal to or smaller than the distance obtained by subtracting the third distance L3 from the first distance L1 (YES in step S35), the machine controller 20*a* sets the special gripping position to the position of the spindle 25 moving back the fourth distance L4 (step S36). The collet chuck 251 of the spindle 25 does not interfere with the pusher 44 even if the spindle 25 moves the fourth distance L4. Then, step S31 is performed and, in step S32, the spindle moves back to the special gripping position set in step S36.

When the second distance L2 is greater than the distance obtained by subtracting the third distance L3 from the first distance L1 in step S28 (NO in step S28) or when the fourth distance L4 is greater than the distance obtained by subtracting the third distance L3 from the first distance L1 in step S35 (NO in step S35), the machine controller 20*a* sets the special gripping position to the position of the spindle 25 moving back the distance obtained by subtracting the third distance L3 from the first distance L1 (step S34). Then, step S31 is performed and, in step S32, the spindle moves back to the special gripping position set in step S34.

On the other hand, when the calculation function of the special gripping position is disabled in step S21 (NO in step S21), the machine controller 20*a* determines whether the operator has specified the special gripping position by using the machining program or the lathe operation panel 24 (step S37). When the operator has specified the special gripping position, the special gripping position is stored in the storage unit 203. When the operator has specified the special gripping position (YES in step S37), the machine controller 20*a* sets the special gripping position to the operator-specified position (step S38). The special gripping position specified by the operator may be limited to a position closer to the rear end side of the bar W than the predetermined gripping position. In other words, the special gripping position may be limited to a rearer position than the predetermined gripping position with respect to the axial direction of the bar W. Then, step S31 is performed and, in step S32, the spindle moves back to the special gripping position set in step S38.

When the special gripping position is not specified in step S37 (NO in step S37), the machine controller 20*a* obtains the third distance L3 from the storage unit 203 by calculating the first distance L1 and the fourth distance L4 (step S39) as in step S22 (step S41). Next, the machine controller 20*a* compares the fourth distance L4 with the distance obtained by subtracting the third distance L3 from the first distance L1 (step S42). Step S42 determines whether the collet chuck 251 of the spindle 25 does not interfere with the pusher 44 even when the spindle 25 moves the fourth distance L4. When the fourth distance L4 is equal to or smaller than the distance obtained by subtracting the third distance L3 from the first distance L1 (YES in step S42), the machine controller 20*a* sets the special gripping position to the position of the spindle 25 moving back the fourth distance L4 (step S43). Then, step S31 is performed and, in step S32, the spindle moves back to the special gripping position set in step S43.

When the fourth distance L4 is greater than the distance obtained by subtracting the third distance L3 from the first distance L1 in step S42 (NO in step S42), the machine controller 20*a* sets the special gripping position to the position of the spindle 25 moving back the distance obtained by subtracting the third distance L3 from the first distance L1 (step S44). Then, step S31 is performed and, in step S32, the spindle moves back to the special gripping position set in step S44.

The runout of the bar W is extremely large when the bar W rotates at a critical speed (the number of revolutions at which resonance occurs). The critical speed depends on the properties, such as the material and length of the bar W. Normally, the rotation speed is less likely to reach the critical speed when a length of the bar W at the rear side of the collet chuck 251 is short. Accordingly, when the length of the bar W at the rear side of the collet chuck 251 is short, runout of the bar W is less likely to occur. On the other hand, even when the length of the bar W at the rear side of the collet chuck 251 is long, runout of the bar W is less likely to occur by the steadying members 311 functioning at the steadying positions. In the lathe system 1 and the method of controlling the lathe system 1 described above, when a determination to evacuate the steadying members 311 from the steadying positions is made, the gripping position selecting unit 20*b* selects the special gripping position instead of the predetermined gripping position. That is, the gripping position selecting unit 20*b* selects the special gripping position when the length from the rear end of the cantilevered bar W to the collet chuck 251 is relatively long and the runout of the bar W is most likely to occur because the bar W is not supported by the steadying apparatus 31. Since the embodiment suppresses the runout of the bar W and the vibration of the spindle 25 due to the runout, degradation in the machining quality of the lathe system can be prevented.

The predetermined gripping position is often set to a position in the movable range of the spindle 25 as closest to the forward side as possible. This is because the collet chuck 251 and the guide bush 26 are brought closer to each other to make the bar W less likely to bend at the machining point and improve the machining quality. On the other hand, the special gripping position is set to a rearer position than the predetermined gripping position with respect to the axial direction of the bar W. When the special gripping position is used, the bending of the bar W at the machining point may be slightly greater than that at the predetermined gripping position. However, degradation in the machining quality due to the bending of the bar W is very small as compared to degradation in the machining quality due to the runout of the bar W. Accordingly, the runout of the bar W is preferably prevented by selecting the special gripping position as in the embodiment when the positional relationship with which an increase of runout is expected is established.

Next, modifications of the embodiment will be described. In the following description, the component, control, or operation having the same name as that described above is denoted by the same reference numeral described above and duplicate description may be omitted.

Figure 10:
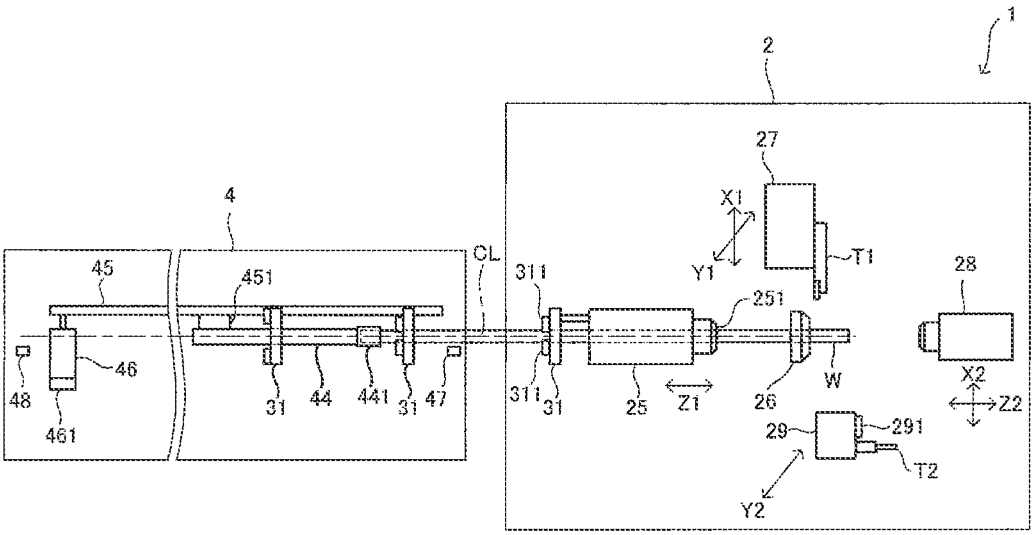
FIG. 10 is a plan view schematically illustrating the internal structure of a lathe system of a first modification.

FIG. 10 is a plan view schematically illustrating the internal structure of a lathe system of a first modification.

A lathe system 1 of the first modification differs from that of the previous embodiment in that the steadying apparatus 31 is also disposed in the bar feeder 4 as illustrated in FIG. 10. In FIG. 10, the two steadying apparatuses 31 are disposed in the bar feeder 4. The steadying apparatuses 31 disposed in the bar feeder 4 have the same structure as the steadying apparatus 31 of the embodiment described above except that the steadying apparatuses 31 are fixed to the bar feeder 4. That is, unlike the steadying apparatus 31 disposed in the NC lathe 1, the steadying apparatuses 31 disposed in the bar feeder 4 do not move regardless of whether the spindle 25 moves. In addition, the steadying apparatuses 31 disposed in the bar feeder 4 are controlled by the bar feed controller 40*a* (see FIG. 5). When the steadying apparatuses 31 are disposed in the bar feeder 4, the second control apparatus 40 sends, to the first control apparatus 20, information about the evacuation of the steadying members 311 when a determination to evacuate the steadying members 311 is made.

Then, the gripping position selecting unit 20*b* of the first modification (see FIG. 5) selects the special gripping position when any one of the three steadying apparatuses 31 evacuates the steadying members 311 to the retreat positions in step S12 illustrated in FIG. 6. That is, although the special gripping position is selected only once to manufacture a plurality of products having the same shape from the single bar W in the previous embodiment described above, the special gripping position is selected three times in the lathe system 1 of the first modification. This modification also has the same effect as the previous embodiment.

Figure 11:
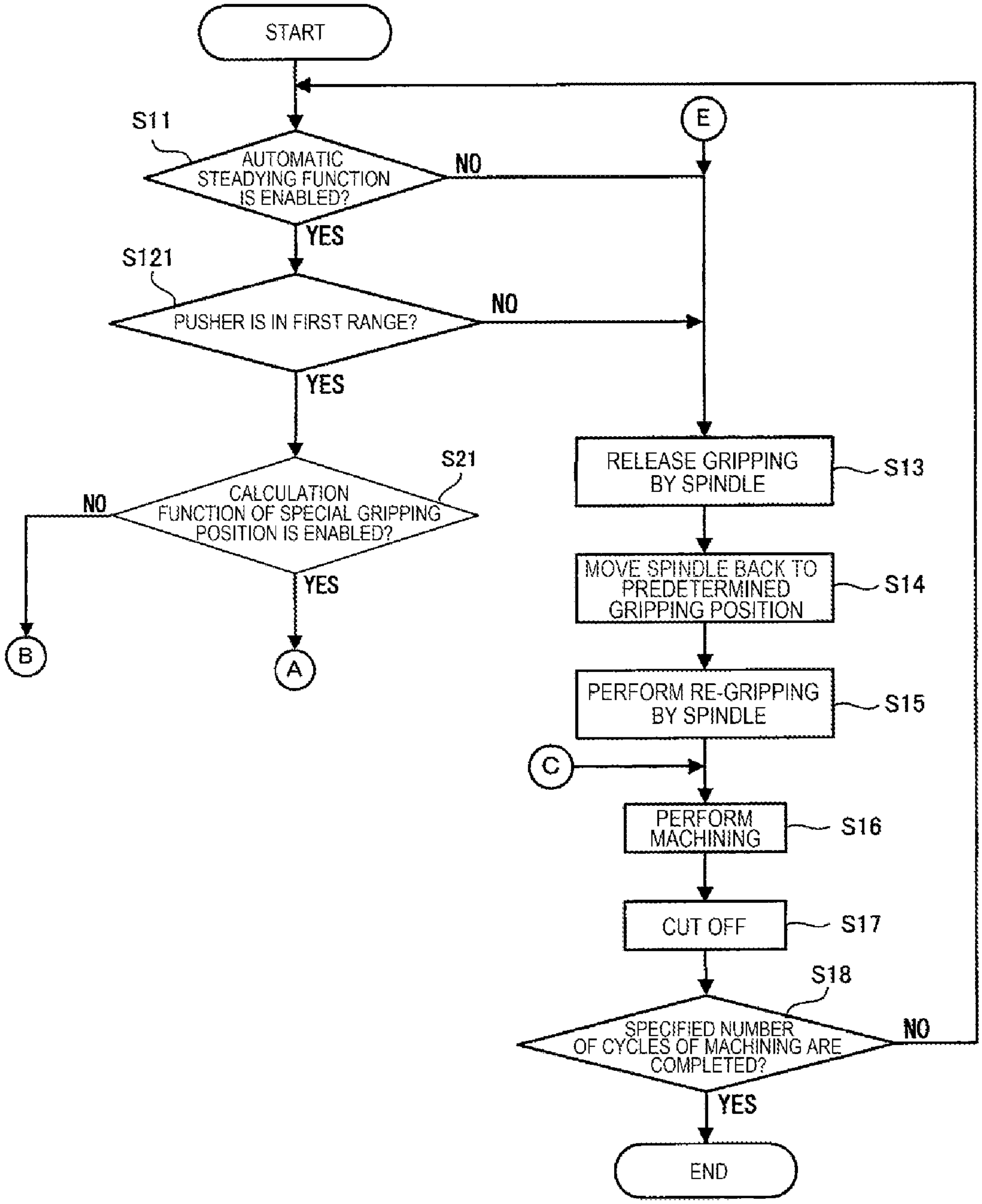
FIG. 11 is a flowchart similar to the flowchart in FIG. 6, illustrating the operation of a lathe system of a second modification.

FIG. 11 is a flowchart similar to the flowchart in FIG. 6, illustrating the operation of a lathe system of a second modification. The operation described by using the flowchart in FIGS. 7 and 8 is the same as in the lathe system 1 of the second modification, and accordingly, a description thereof is omitted.

The gripping position selecting unit 20*b* (see FIG. 5) of the lathe system 1 of the second modification selects either the predetermined gripping position or the special gripping position according to whether the pusher 44 is located in a first range before a grip change (step S121), instead of step S12 in which selection is performed according to the evacuation of the steadying members 311 (see FIG. 2). The case in which the pusher 44 is located in the first range before the grip change corresponds to an example of the case in which the predetermined condition is met. In the lathe system 1 of the second modification, selection by the gripping position selecting unit 20*b* is performed regardless of the evacuation of the steadying members 311. Accordingly, the flowchart illustrated in FIG. 11 does not illustrate the operation of step S19. The first range is specified by the machining program and the specified value is stored in the storage unit 203. However, the first range may be specified and stored in the storage unit 203 by an input operation from the lathe operation panel 24. The first range may be specified by the moving distance of the pusher 44 from the detection position of the home position sensor 48 or may be specified by the front end position of the pusher 44.

This modification also has the same effect as the previous embodiment. In addition, this modification also has the effect that causes the operator to freely set, as the first range, the range in which the runout of the bar W is likely to occur, separately from the operation position of the steadying apparatus 31.

Next, a lathe system 1 of another embodiment will be described.

Figure 12:
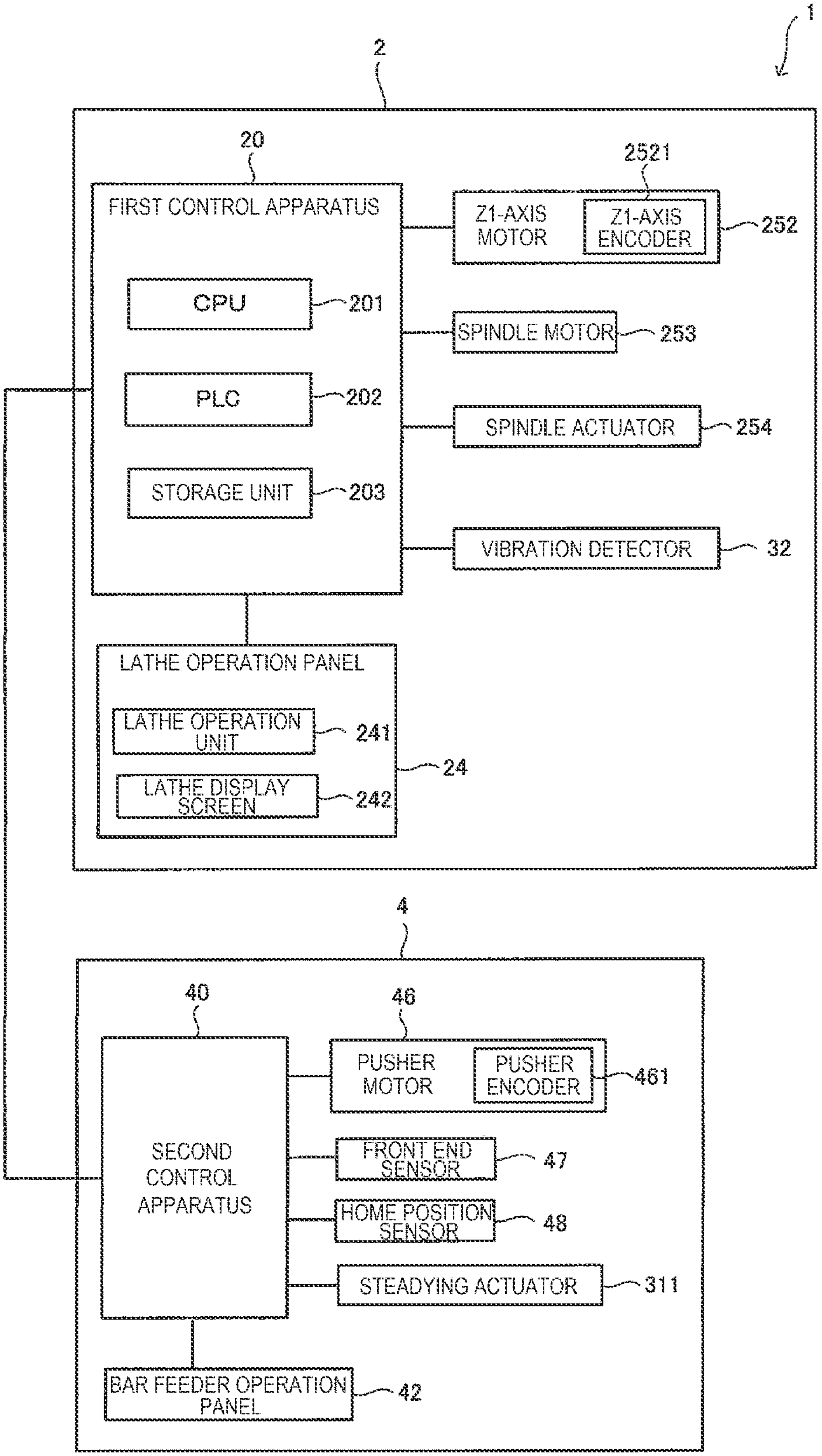
FIG. 12 is a block diagram illustrating the hardware structure of a lathe system of another embodiment.

FIG. 12 is a block diagram illustrating the hardware structure of a lathe system of another embodiment.

As illustrated in FIG. 12, the lathe system 1 of another embodiment differs from that of the previous embodiment in that a vibration detector 32 is provided. The lathe system 1 of another embodiment also differs from that of the previous embodiment in that the gripping position selecting unit 20*b* (see FIG. 5) performs the selection according to the detection result of the vibration detector 32. The vibration detector 32 is attached to the spindle 25 (see FIG. 2) and mainly detects the vibration of the spindle 25. However, the vibration detector 32 may be attached to another structural object provided in the NC lathe 2, such as a headstock or a leg. The vibration detector 32 is a sensor that detects vibration, and the waveform of the detected vibration is constantly sent to the first control apparatus 20.

Figure 13:
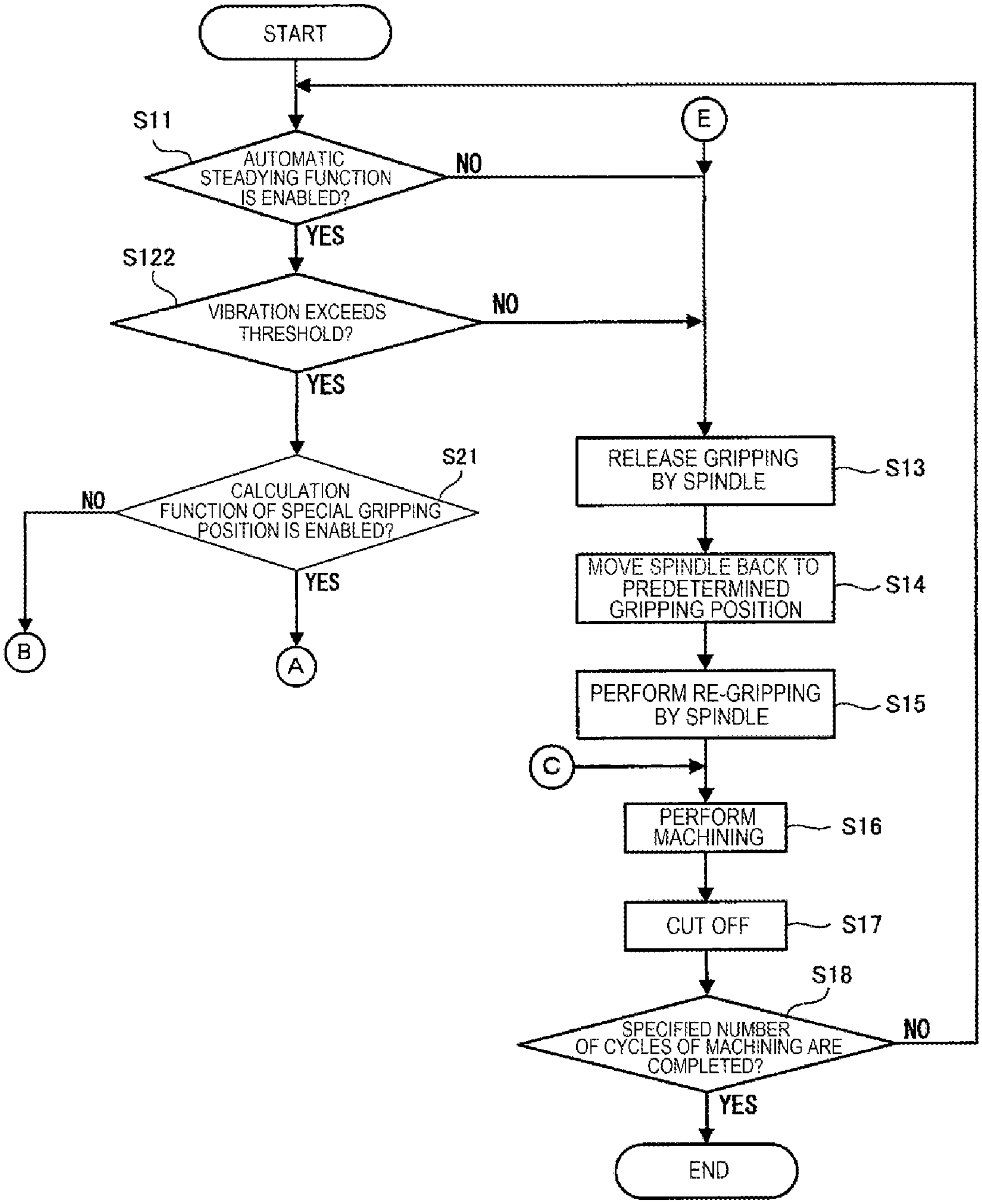
FIG. 13 is a flowchart similar to the flowchart in FIG. 6, illustrating the operation of the lathe system illustrated in FIG. 12.

FIG. 13 is a flowchart similar to the flowchart in FIG. 6, illustrating the operation of the lathe system illustrated in FIG. 12. The operation described by using the flowchart in FIGS. 7 and 8 is the same as in the lathe system 1 of another embodiment, and accordingly, a description thereof is omitted.

The gripping position selecting unit 20*b* of the lathe system 1 of another embodiment selects either the predetermined gripping position or the special gripping position according to whether the vibration detected by the vibration detector 32 exceeds a threshold (step S122), instead of step S12 in which selection is performed according to the evacuation of the steadying members 311. The case in which the vibration detected by the vibration detector 32 exceeds the threshold before a grip change corresponds to an example of the case in which the predetermined condition is met. In the lathe system 1 of another embodiment, the selection by the gripping position selecting unit 20*b* is performed regardless of the evacuation of the steadying members 311. Accordingly, the flowchart illustrated in FIG. 13 does not illustrate the operation of step S19. The gripping position selecting unit 20*b* determines whether the vibration detected by the vibration detector 32 exceeds the threshold according to the amplitude. However, the gripping position selecting unit 20*b* may determine whether the vibration detected by the vibration detector 32 exceeds the threshold according to the acceleration of the vibration. In addition, the gripping position selecting unit 20*b* may comprehensively determine whether the vibration detected by the vibration detector 32 exceeds the threshold according to the amplitude and the acceleration of the vibration. The threshold used by the gripping position selecting unit 20*b* is specified by the machining program and the specified value is stored in the storage unit 203. However, the threshold may be specified and stored in the storage unit 203 by an input operation from the lathe operation panel 24.

The other embodiment described above also has the same effect as the previous embodiment. In addition, since the gripping position selecting unit 20*b* selects the position at which the bar W is re-gripped according to the vibration detected by the vibration detector 32, the selection corresponds to actual vibration.

The present invention is not limited to the embodiments described above, and various modifications can be made within the scope of the appended claims. In addition, a constituent element included in only one of the embodiments described above or only one of the modifications described above may be applied to other embodiments or other modifications.

What is claimed is:

1. A machine tool system comprising:

a first spindle configured to grip a bar and moving back and forth in an axial direction of the bar;

a tool post to which a machining tool is attached, the machining tool machining the bar gripped by the first spindle; and a second spindle;

the machine tool system configured to manufacture a plurality of products having an identical shape from the bar by repeating a machining of the bar gripped by the first spindle, a cutting off of a machined portion of the bar, a pass of the cut off machined portion to the second spindle, and a grip change by the first spindle, the grip change by the first spindle comprising releasing the bar gripped by the first spindle, moving back the first spindle, and re-gripping the bar at a predetermined gripping position by the first spindle, and the machine tool system further comprising a gripping position selecting unit configured to select a bar suppressing position at which the first spindle re-grips the bar when a state of the machine tool system meets a predetermined condition, the bar suppressing position being different from the predetermined gripping position, wherein the bar suppressing position is a position suppressing runout of the bar and located rearward of the predetermined gripping position with respect to the axial direction of the bar.

2. The machine tool system of claim 1, further comprising:

a steadying apparatus disposed in a position located rearward of the first spindle with respect to the axial direction of the bar, the steadying apparatus comprising a steadying member movable between a steadying position in contact with the bar and a retreat position away from the bar, wherein the state of the machine tool system meets the predetermined condition when a determination to move the steadying member to the retreat position before the grip change is made.

3. The machine tool system of claim 1, further comprising a pusher configured to move together with the bar, wherein the state of the machine tool system meets the predetermined condition when the pusher is located in a specified range in the axial direction of the bar before the grip change.

4. The machine tool system of claim 3, wherein the specified range is specified by a machining program.

5. The machine tool system of claim 1, further comprising a vibration detector configured to detect vibration generated by runout of the bar, wherein the state of the machine tool system meets the predetermined condition when the vibration detected by the vibration detector exceeds a threshold.

6. A method of controlling a machine tool system including a first spindle and a tool post to which a machining tool machining the bar gripped by the first spindle is attached, and a second spindle, the machine tool system manufacturing a plurality of products having an identical shape from the bar, the method comprising:

selecting a gripping position that selects a predetermined gripping position when a state of the machine tool system does not meet a predetermined condition and that selects a bar suppressing position when the state of the machine tool system meets the predetermined condition, the bar suppressing position being different from the predetermined gripping position;

performing a grip change by the first spindle that comprises releasing the bar gripped by the first spindle, moving the first spindle to the selected gripping position, and re-gripping the bar by the first spindle;

machining the re-gripped bar; and cutting off a machined portion of the bar and passing the cut off machined portion to the second spindle;

wherein the bar suppressing position is a position suppressing runout of the bar and located rearward of the predetermined gripping position with respect to the axial direction of the bar.

* * * * *